Figure 1:
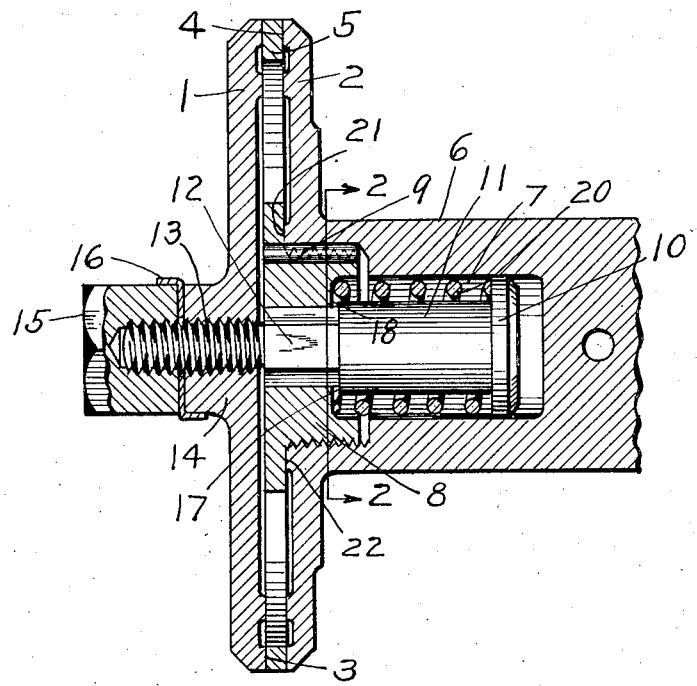

June 23, 1936.  W. E. DEAN, JR  2,045,177

PISTON DEVICE

Filed Jan. 23, 1934

INVENTOR
WILLIAM E. DEAN, Jr. (DECEASED)
DORIS BROWN DEAN, EXECUTRIX

BY Wm. M. Cady
ATTORNEY

Patented June 23, 1936

2,045,177

UNITED STATES PATENT OFFICE 2,045,177

PISTON DEVICE

William E. Dean, Jr., deceased, late of Hamilton, Ontario, Canada, by Doris Brown Dean, Edgewood, Pa., executrix, assignor to The Westinghouse Air Brake Company, Wilmerding, Pa., a corporation of Pennsylvania Application January 23, 1934, Serial No. 707,926

5 Claims. (Cl. 309—4)

This invention relates to pistons and more particularly to pistons for use in fluid pressure systems.

It has heretofore been proposed to provide a piston for fluid pressure systems in which the piston is formed of two plates adapted to cooperate to form the side walls of a groove for a piston ring, resilient means being usually provided to yieldingly press the plates against the sides of the ring to prevent leakage, and, in case of wear between the engaging surfaces of the ring and piston plates, the resilient means acts to move the plates toward each other, thereby maintaining proper contact between said plates and the sides of the ring.

It is practically impossible to prevent all leakage past the side of a piston ring, and in a two part piston, such as described above, some fluid will leak past the ring into the space formed within the piston ring and between the two piston plates, so that in case fluid pressures are equalized on the opposite sides of the piston, the same pressure will be obtained in the space between the two piston plates. When the pressure of fluid on one side of the piston is then reduced below that on the opposite side to effect movement of the piston in the direction of the lower pressure, the pressure between the piston plates tends to move the plates apart and thereby provides clearance past the sides of the ring which permits flow of the high pressure fluid at one side of the piston to the low pressure at the opposite side.

The amount of this flow past the sides of the piston ring depends mostly upon how great a distance the two parts of the piston can move apart, or in other words the amount of clearance between the sides of the ring and the ring groove. It has been found, in connection with a triple valve device for a fluid pressure brake system, that if this side clearance between the ring and groove exceeds a predetermined amount, the triple valve device will not operate upon a service reduction in brake pipe pressure to apply the brakes, but if this side clearance does not exceed said predetermined amount, the triple valve device will operate as intended upon a service reduction in brake pipe pressure.

One object of the invention is to provide a two part piston of the type having two separable plates yieldingly urged into engagement with the sides of a piston ring to prevent leakage, and having means for positively limiting the separating movement of said piston plates to a predetermined amount, so as to obviate the above described difficulties encountered with previous constructions of pistons of this character, without loss of the advantages of said previous constructions.

Another object of the invention is to provide an improved two part piston in which the two separable piston plates are pressed against the side faces of a piston ring with a predetermined pressure exerted by a coil spring, and having positive means for accurately adjusting the pressure of said spring and for positively limiting separation of said plates and thereby limiting the side clearance between the piston ring and cooperating surfaces of the piston plates under conditions such as above described.

Figure 2:
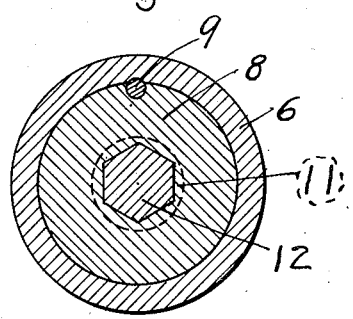

In the accompanying drawing: Fig. 1 is a side elevation, mainly in section, of a piston construction embodying the invention; and Fig. 2 is a sectional view taken on the line 2—2 of Fig. 1.

As shown in the drawing, the improved piston comprises piston plates 1 and 2 having accurately finished side surfaces 3 and 4, respectively, adapted to engage corresponding side surfaces of a piston ring 5, the surfaces 3 and 4 thereby defining the side walls of a groove for said ring.

The piston plate 2 is provided on its outer face with an axial extension 6 in which there is formed a chamber 7.

A stud having a head 10 and a cylindrical body portion 11 contained in the chamber 7, is provided with a polygonal portion 12 slidably mounted in an opening of corresponding shape extending through the piston plate 2 to the inner face thereof, and is also provided with a screw-threaded portion 13 extending through and having screw-threaded engagement with a hub 14 provided on the piston plate 1. A jam nut 15 is provided on the outer end of the screw-threaded portion of the stud and a lock washer 16 is interposed between said jam nut and hub for locking the piston plate 1 in an adjusted position on the stud.

The cylindrical portion 11 of the stud is preferably of greater diameter than that across the corners of the polygonal section of the stud in order to provide a surface or shoulder 17 adapted to cooperate with a surface 18 on the piston plate 2 within chamber 7, for reasons which will be hereinafter described. A spring 20, surrounding the cylindrical portion 11 of the stud, is interposed between the surface 18 on the piston plate 2 and the adjacent surface of the head 10 of the stud.

For the purpose of assembling stud 10 and spring 20 in the piston plate 2, in the present embodiment of the invention, the piston plate 2 is formed in two portions, namely, the main body portion and a removable portion 8 having screw-threaded engagement therewith.

In assembling the improved piston, the spring 20 is mounted on the stud which is then mounted in the removable portion 8 of the piston plate. The head of the stud is then inserted into chamber 7 and the portion 8 screwed into the main body portion of the piston plate 2 to a predetermined position which may be defined by engagement of surfaces 21 and 22 on the two portions of the piston plate. A pin 9 is then driven into a bore provided in engaging portions of the two portions of the piston plate 2 to hold the portion 8 in place. The piston ring 5 is then positioned between the piston plates 1 and 2 and the piston plate 1 is screwed onto the screw-threaded portion 13 of the stud. The surfaces 3 and 4 of the piston plates 1 and 2, respectively, are thereby brought into engagement with the side faces of the piston ring 5, after which, the piston plate 1 is further screwed onto said stud until shoulder 17 on the stud engages surface 18 on the piston plate 2, as can readily be determined by the sense of feel. It will be evident, that while thus applying the piston plate 1 to the stud, the polygonal portion 12 of the stud prevents said stud from turning, and that as said stud is pulled out of chamber 7, the spring 20 is compressed.

After shoulder 17 on the stud engages surface 18 on the piston plate 2, the piston plate 1 is backed off a predetermined distance, depending upon the pitch of the threads on the stud, to provide a certain definite space between shoulder 17 and surface 18, and then the lock washer 16 and jam nut 15 are applied to the end of the stud.

This definite space between shoulder 17 and surface 18 is adapted to limit the parting movement of the piston plates 1 and 2 away from each other, or in other words, to positively limit the maximum side clearance between the piston ring 5 and piston plates 1 and 2, which it is possible to permit and yet ensure proper functioning of the piston under pressure differential conditions such as hereinbefore described. It will be evident, that, since in the act of assembling the piston parts, the shoulder 17 is drawn up into direct contact with the surface 18 on the piston plate 2 and the piston plate 1 is then backed off a predetermined degree, the pressure of the spring 20 does not enter into this act of adjustment, so that the adjustment may be made very accurate. The pressure of the spring 20 yieldingly urges the piston plates 1 and 2 against the sides of the piston ring 5 to prevent leakage past said ring, but still is of such value as to permit free expansion or contraction of the ring in order to maintain the proper peripheral contact with the wall of the piston cylinder (not shown) in case lubricant between the piston plates or ring become gummy or in case of a particle of dirt getting between the side of the ring and the engaging surface of one of the piston plates.

It will be noted that the improved piston retains all of the advantages of two part pistons of previous constructions, in that, the surfaces on the piston plates, which contact with the sides of the ring, are accessible to permit accurate finishing to provide a seal against the accurately finished surfaces of the piston ring; the spring 20 serves to maintain contact between the piston plates 1 and 2 and the ring 5 to prevent leakage, and also serves to automatically take up wear between the piston plates and piston ring; and the piston ring 5 can be applied to the piston without lateral or radial distortion or otherwise damaging of the ring, and it will be further noted that, in the present embodiment of the invention, the piston plate 2 is formed in two portions merely for the purpose of assembly.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a piston, the combination with two separable piston plates and a packing ring slidably mounted between said plates, of a stud secured to one of said plates and slidably extending through an opening in the other of said plates, a shoulder on said stud normally spaced away from said other plate and adapted to be engaged by said other plate for limiting parting movement of said plates, and resilient means acting on said plates urging said plates into engagement with said ring.

2. In a piston, the combination with two separable piston plates and a packing ring slidably mounted between said plates, of a stud secured to one of said plates and slidably extending through an opening in the other of said plates, a shoulder on said stud normally spaced away from said other plate and adapted to be engaged by said other plate for limiting parting movement of said plates, and a spring carried by said stud and acting on the last mentioned plate urging said plates into engagement with said ring.

3. In a piston, the combination with two separable piston plates and a piston ring slidably mounted between said plates, one of said plates having a chamber with an opening through one end wall, a stud slidably mounted in said opening and having one end extending into said chamber, the other piston plate being secured to the other end of said stud, a shoulder on said stud adapted to engage the end surface of said chamber for limiting parting movement of said piston plates, and resilient means urging said piston plates into engagement with said ring.

4. In a piston, the combination with two separable piston plates and a piston ring slidably mounted between said plates, of a protuberance on the outer face of one of said piston plates having a chamber open at one end to the inner face of the piston plate, a plug closing the open end of said chamber and secured to the piston plate, said plug having an axial opening, a member slidably mounted in said opening and having on the inner side of the plug a portion extending into said chamber and on the outer side of the plug a portion secured to the other piston plate, a shoulder on the portion of the plug within the chamber adapted to engage the inner surface of said plug to positively limit parting movement of said piston plates, and a spring carried by said stud within said chamber and acting on the inner face of said plug for urging said piston plates into engagement with said ring.

5. In a piston, the combination with two separable piston plates and a piston ring slidably mounted between said plates, of a stud secured to one of said plates by screw-threaded engagement and extending through an opening in the other plate and adapted to slide through said opening, said stud having a shoulder adapted to be pulled into engagement with a surface which surrounds said opening in the second mentioned plate when the first mentioned plate is screwed onto said stud, and adapted to be spaced from said surface according to the amount the first mentioned plate is backed off on said stud for limiting parting movement of said plates and thereby side clearance of said ring between said plates, and a spring carried by said stud and acting on the second mentioned plate urging said plates against said ring.

DORIS BROWN DEAN,
*Executrix of the Last Will and Testament of William E. Dean, Jr., Deceased.*